United States Patent [19]

Chang

[11] Patent Number: 4,802,204

[45] Date of Patent: Jan. 31, 1989

[54] SELECTING INTERFACE DEVICE FOR FACSIMILE APPARATUSES

[75] Inventor: TsaiFa Chang, Taipei, Taiwan

[73] Assignee: Climax Technology Co., Ltd., Taipei, Taiwan

[21] Appl. No.: 100,957

[22] Filed: Sep. 25, 1987

[51] Int. Cl.⁴ .............................................. H04N 1/22
[52] U.S. Cl. ..................................... 379/100; 358/256; 358/257; 358/258
[58] Field of Search ................ 379/100; 358/256, 257, 358/258; 370/60; 358/181

[56] References Cited

U.S. PATENT DOCUMENTS 3,914,539 10/1975 Hashimoto ........................... 358/257
4,644,529 2/1987 Amstotz et al. ....................... 370/60
4,686,698 8/1987 Tompkins et al. ................... 358/181

Primary Examiner—John W. Caldwell, Sr.
Assistant Examiner—Tyrone Queen
Attorney, Agent, or Firm—Harness, Dickey & Pierce

[57] ABSTRACT

The present invention discloses a selecting device for interfacing between a telephone line and two facsimile apparatuses and comprises a telephone line; terminal adapted to be coupled with the telephone line; two facsimile apparatus terminals adapted to be coupled with the two facsimile apparatuses respectively; a loop selection circuit coupled with the telephone line terminal and the facsimile apparatus terminals; and means, coupled with the loop selection circuit, for controlling the loop selection circuit selectively to couple two of the telephone line terminal and the facsimile apparatus terminals with each other.

8 Claims, 8 Drawing Sheets

SELECTING INTERFACE DEVICE FOR FACSIMILE APPARATUSES

BACKGROUND OF THE INVENTION

The present invention relates to a selecting device for interfacing between a telephone line, a facsimile machine and a facsimile card installed in a computer.

The personal computer and facsimile machine or telecopier, at present, are common office equipments, and are also gradually being applied to family use. However, the conventional facsimile machine has some inherent inconveniences in its operation. For example, the information to be transmitted must be first presented as printed matter or a still picture which can be inserted into and scanned by the machine. The facsimile machine cannot be set in advance to transmit the same subject matter to several different places. Although some facsimile machines can be set automatically to feed the paper sheets into the machine for scanning and transmitted at a desired time, they cannot be set to transmit several different subject matters at different times. In addition, they do not have storage facilities for received information and information to be transmitted for consultation by the user. To solve the above-described problems, someone suggested employing a personal computer to build up a facsimile system.

Referring now to FIG. 1, there is illustrated a suggested facsimile system. The system includes a personal computer 100, a facsimile card 102 installed in the computer 100, a high-resolution scanner 104 and a high-resolution printer or laser printer 106. The scanner 104 and printer 106 are coupled with the facsimile card 102 respectively, and have the scanning and printing functions of the conventional facsimile machine. The facsimile card 102 has the functions of exchanging protocols, setting the baud rate, trasmitting and receiving facsimile signals, and other control functions, which are included in the conventional facsimile machine. The facsimile card 102 also efficiently combines the personal computer 100, scanner 104 and laser printer 106 so that the computer's abilities at word processing, CAD/CAM, file/information management, storage, etc. can be added in the facsimile system. Therefore, the facsimile signals sent from the exchange 110 or the scanner 104 can be stored in the storage equipment, such as the hard disk, of the computer 100. Then the user can employ the computer 100 to display and/or amend the stored information, to send it to the laser printer 106 so as to print out, or to transmit it to the other facsimile machine or facsimile system 115 through the telephone line 108 and the exchange 110. Also, it is possible to transmit the same subject matter to several different places at desired times or different subject matters to different places at different times, respectively, by the control of the personal computer 100.

Furthermore, the document created by the personal computer 100 can be transmitted to the other facsimile machine 115 directly through the facsimile card 102 and the exchange 110 without need of a print out. Since several personal computers can be easily combined together, they can commonly utilize one scanner and one laser printer.

The above facsimile system is advantageous over the conventional facsimile machine, but the high-resolution scanner and printer are too expensive to be commonly used. At present, the price of a scanner or laser printer is about 2000.00 to 3000.00 U.S. dollars, and the price of a facsimile machine is about 1670.00 to 3000.00 U.S. dollars. In addition, when the above facsimile system is adopted, the previous facsimile machine must be discarded.

SUMMARY OF THE INVENTION

Therefore, the primary object of the present invention is to provide a selecting device for interfacing between a telephone line, a facsimile card and a facsimile machine, which can efficiently combine the facsimile card and facsimile machine to form an improved facsimile system over the above system, and which is also very cheap.

The other object of the present invention is to provide a selecting device for facsimile apparatuses, which can interface between a telephone line, and at least two facsimile cards or at least two facsimile machines to facilitate the intercommunication between the facsimile cards or machines without transmission through the telephone line. In this specification, the term "facsimile apparatus" is intended to refer to facsimile card, facsimile machine, facsimile telegraph, telecopier, home-fax, and the like.

According to the present invention, a selecting device for interfacing between a telephone line and two facsimile apparatuses, comprises a telephone line terminal adapted to be coupled with the telephone line; two facsimile apparatus terminals adapted to be coupled with the two facsimile apparatuses respectively; a loop selection circuit coupled with the telephone line terminal and the facsimile apparatus terminals; and means, coupled with the loop selection circuit, for controlling the loop selection circuit selectively to couple two of the telephone line terminal and the facsimile apparatus terminals with each other.

BRIEF DESCRIPTION OF THE DRAWINGS

The present invention can be more fully understood by reference to the following detailed description and accompanying drawings, which form an integral part of this application.

DETAILED DESCRIPTION OF THE PREFERRED EMBODIMENTS

Figure 2:
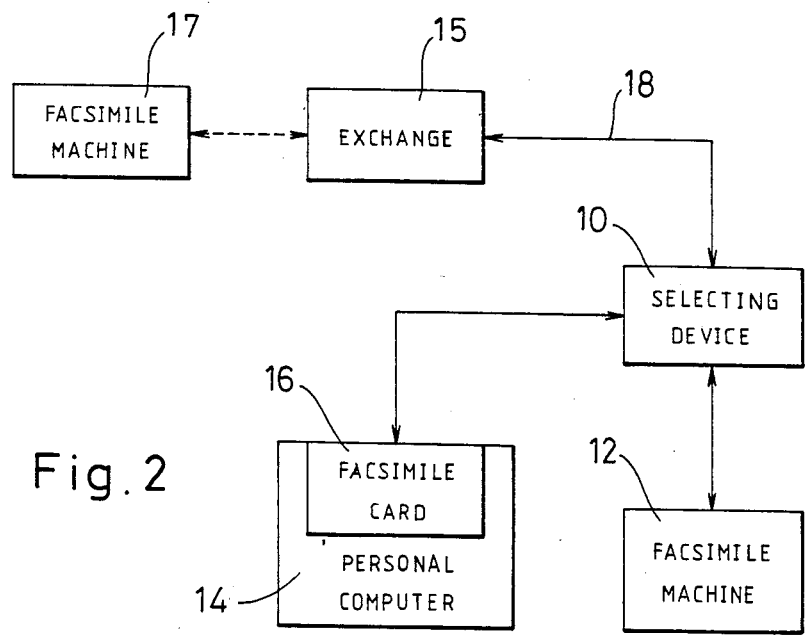
FIG. 2 is a block diagram of an improved facsimile system according to the present invention.

Referring now to FIGS. 2 to 9, it should be noted that a like member is designated by a like reference number. In FIG. 2, the selecting device 10 of the present invention interfaces between a facsimile machine 12, a facsimile card 16 installed to a computer, particularly a personal computer 16, and a telephone line 18 connected to the exchange 15. In accordance with this structure, the facsimile signals created by the facsimile machine 12 when scanning the printed matter or still picture to be facsimiled can be transmitted to the computer 14 via the device 10 and the facsimile card 16 for storage. The information created by or stored within the computer 14 can be transmitted to the facsimile machine 12 via the facsimile card 16 and the device 10 for printout. The information within the computer 14 can be transmitted to the other facsimile machine or facsimile system 17 at the desired time via the facsimile card 16, the device 10, and the exchange 15. The facsimile signals received from the other facsimile machine 17 by the device 10 can be selectively passed to the facsimile machine 12 to be printed out directly, or to the facsimile card 16 so as to be stored within the computer 14. Therefore, in this invention the conventional facsimile machine can be utilized to substitute for the expensive high-resolution scanner and printer used in the above-described facsimile system.

Figure 3:
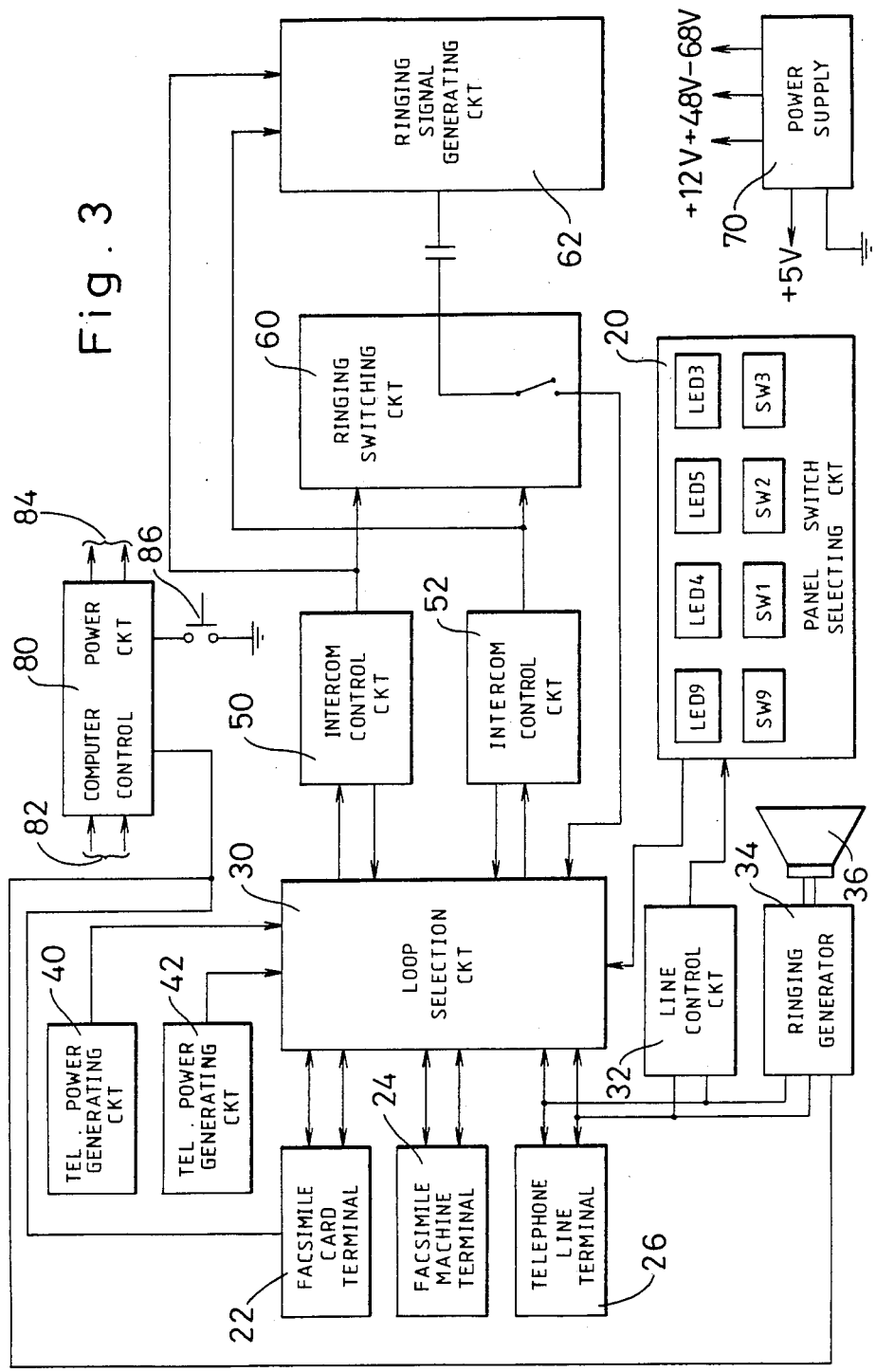
FIG. 3 is a block diagram of a selecting interface device for facsimile apparatuses according to one preferred embodiment of the present invention.
Figure 4:
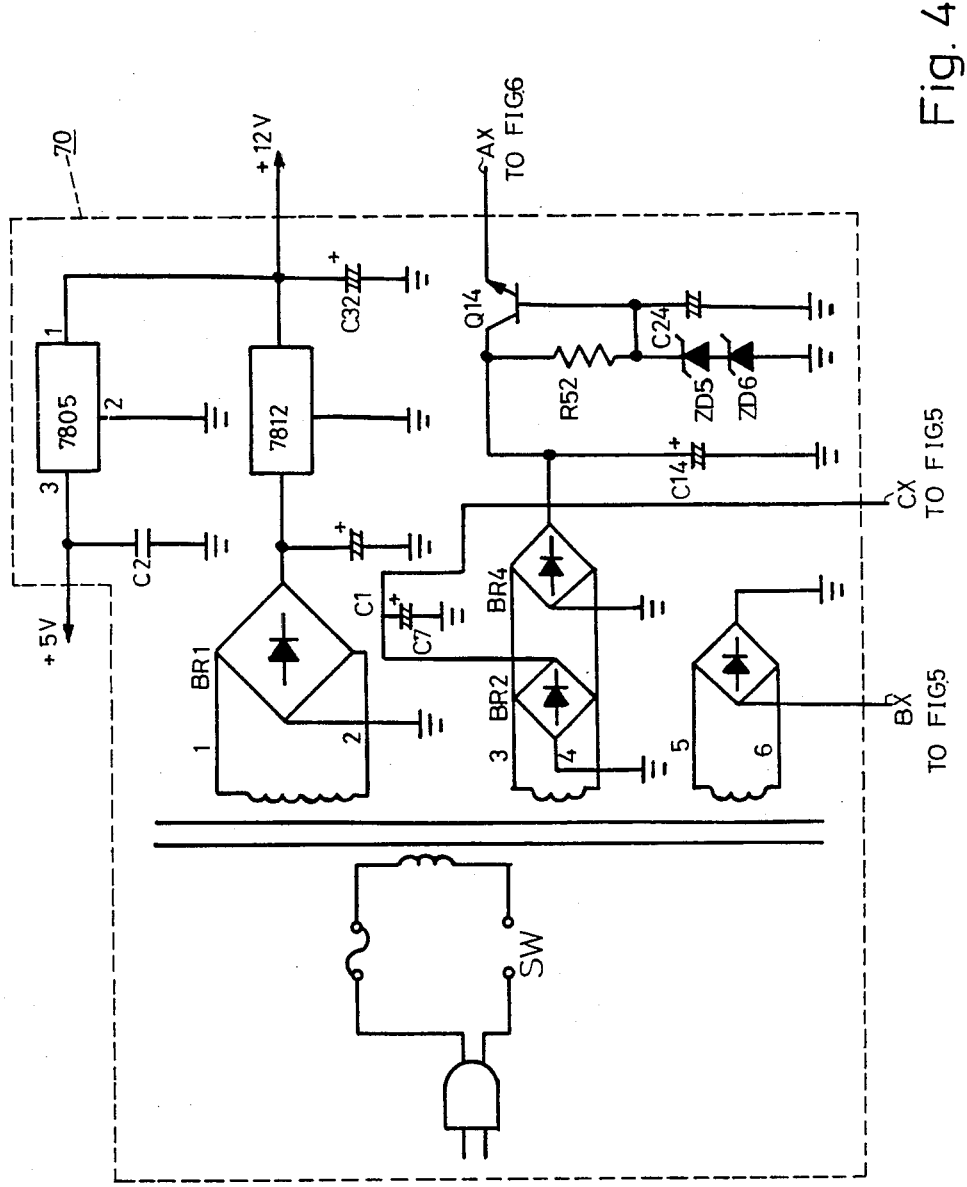
FIGS. 4 to 9 are electrical schematic diagrams of respective parts of the selecting interface device of FIG. 3.
Figure 5:
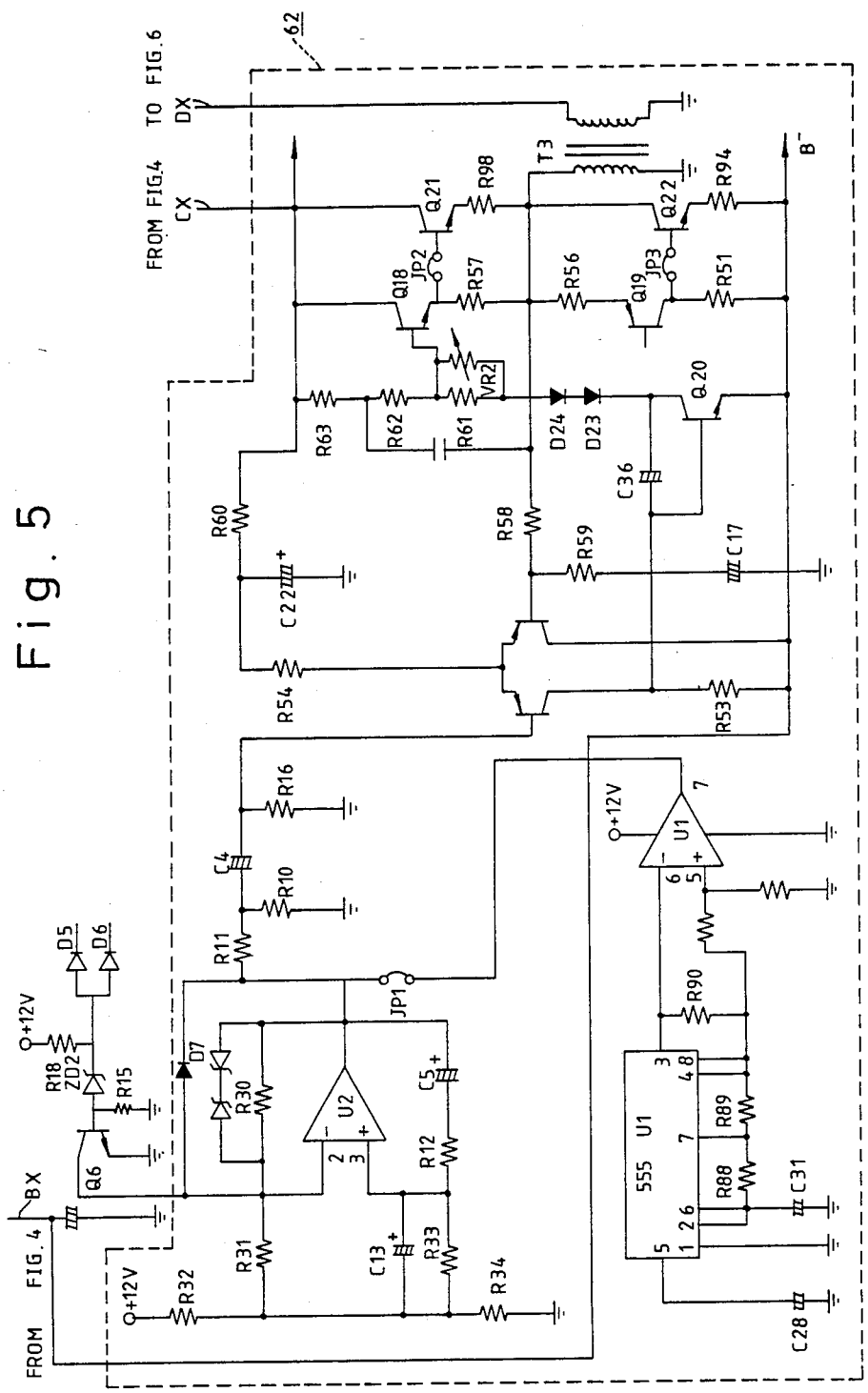
Figure 6:
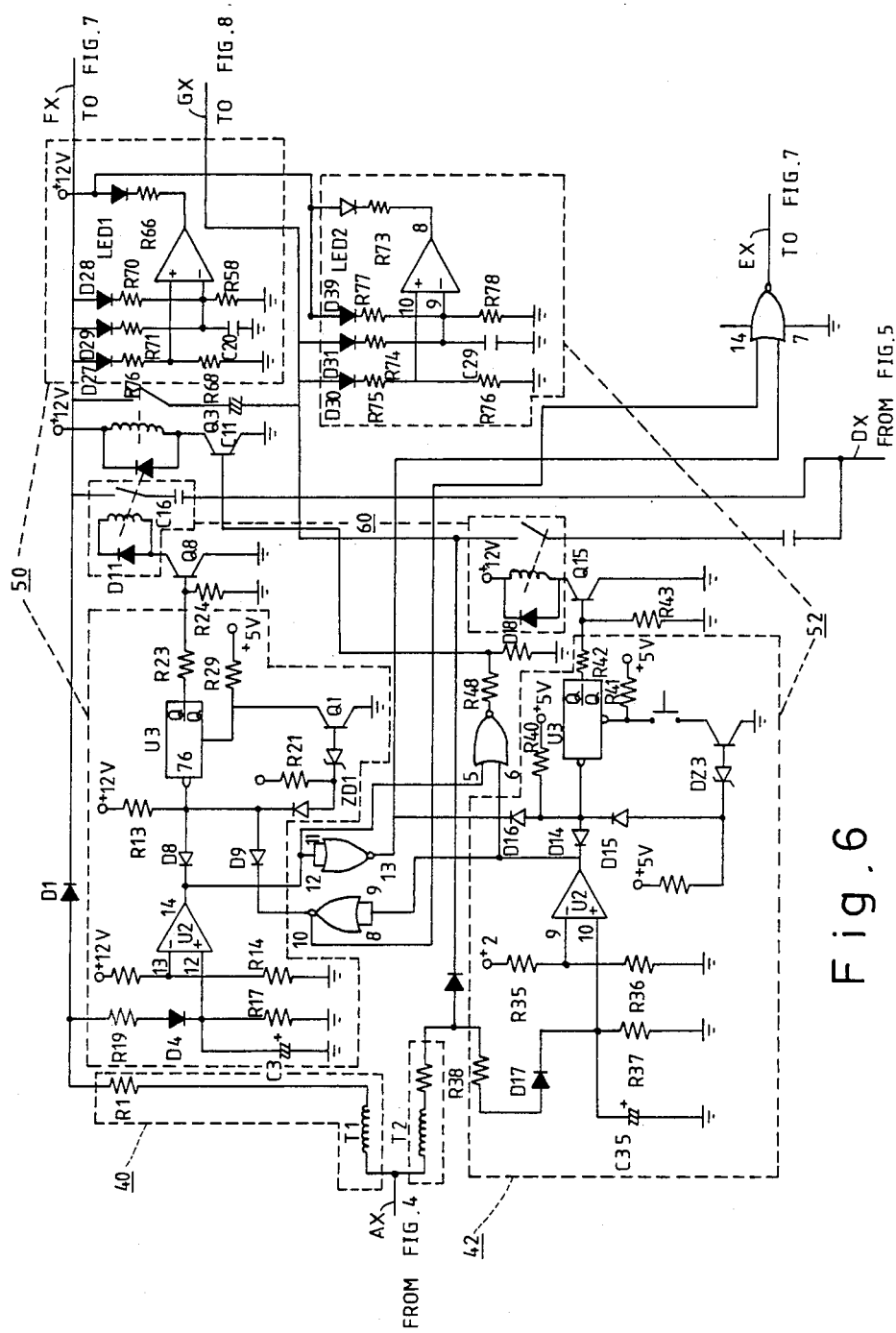
Figure 7:
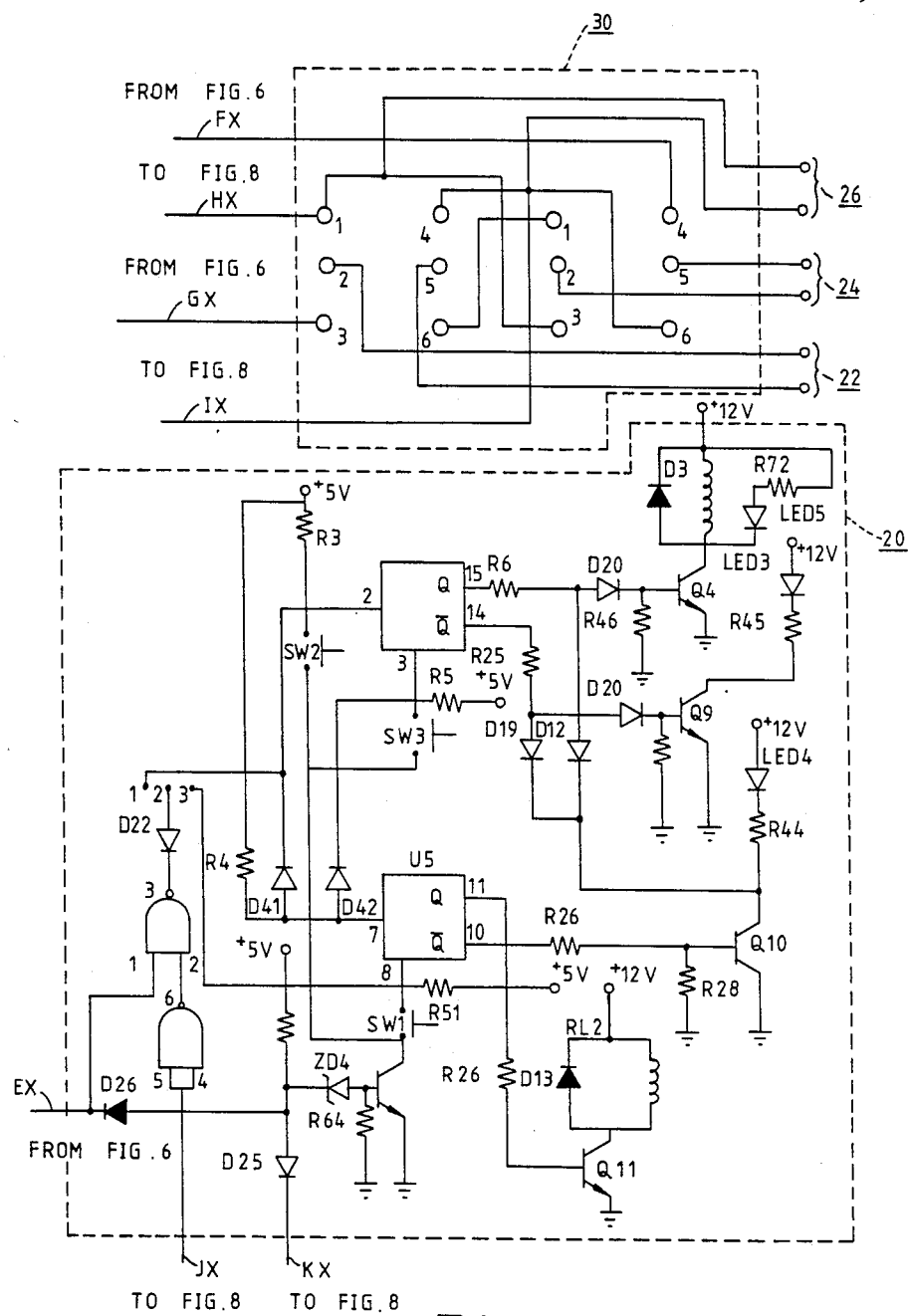
Figure 8:
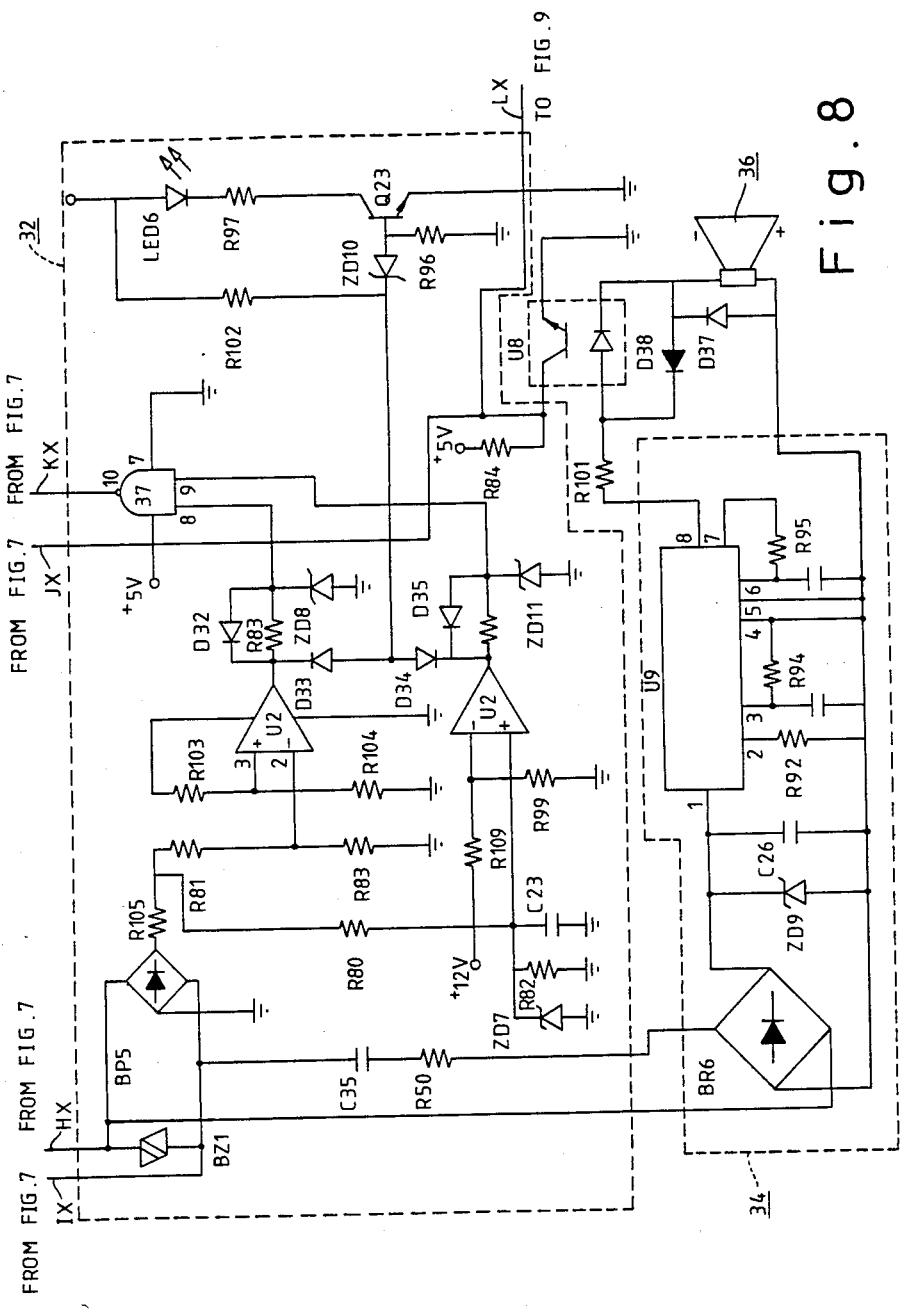
Figure 9:
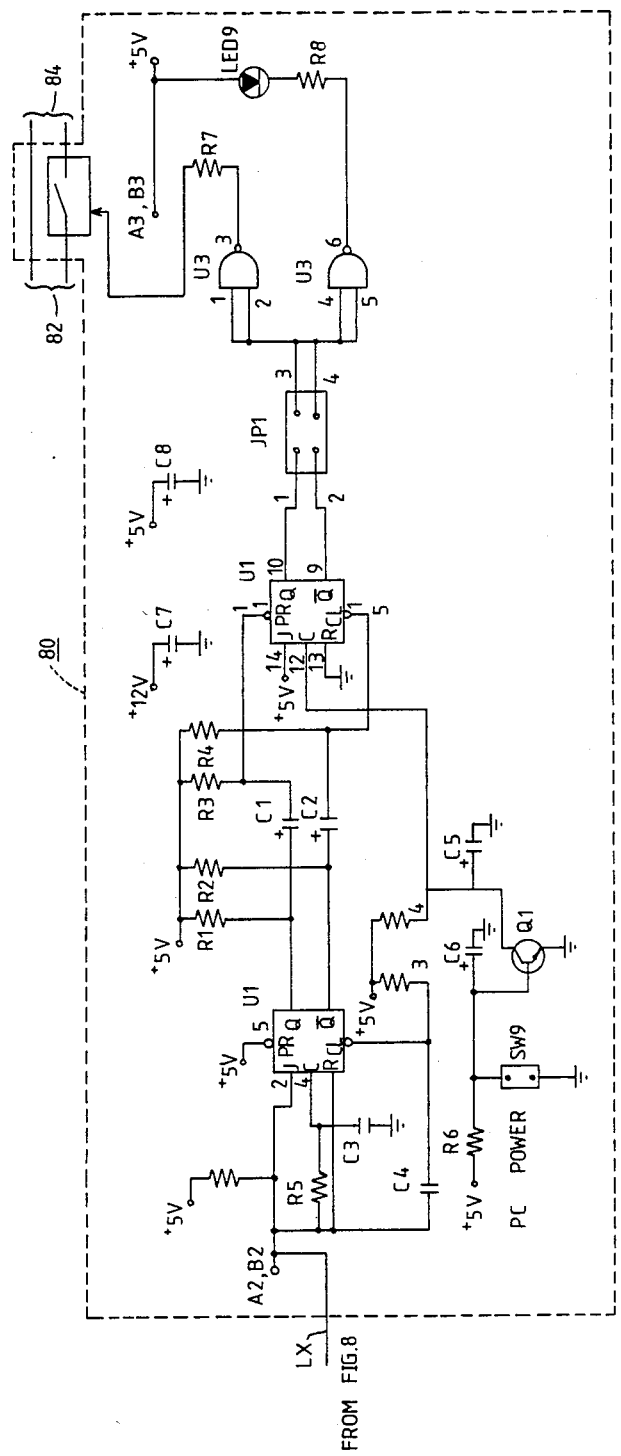

Please refer to FIG. 3 hereinafter until the end of the description and to the corresponding FIGS. 4 to 9. FIG. 3 shows the entire block diagram of the selecting interface device 10 of the present invention, and FIGS. 4 to 9 show electrical schematic diagrams of respective parts of the block diagram shown in FIG. 3 and could be combined to form the entire electrical schematic diagram of the device 10. In FIG. 4, the terminal AX is connected to the terminal AX of FIG. 6, the terminals BX, CX are connected respectively to the terminals BX, CX of FIG. 5. In FIG. 5, the terminal DX is connected to the terminal DX of FIG. 6. In FIG. 6, the terminals EX, FX are connected respectively to the terminals EX, FX of FIG. 7, and the terminal GX is connected to the terminal GX of FIG. 8. In FIG. 7, the terminals HX, IX, JX and KX are connected respectively to the terminals HX, IX, JX and KX of FIG. 8. In FIG. 8, the terminal LX is connected to the terminal LX of FIG. 9.

The selecting interface device 10 includes a panel switch selecting circuit 20 having a facsimile machine, facsimile card and intercom switches SW1, SW2, SW3, and the corresponding indicating elements LED4, LED5, LED3 (FIG. 3 or 7). The device 10 also includes a facsimile card, facsimile machine and telephone line terminals 22, 24, 26, and a loop selection circuit 30 having six relays (FIG. 3 or 7). The three terminals 22, 24 and 26 are coupled with the loop selection circuit 30, and adapted to be coupled with the facsimile card 16, facsimile machine 12 and telephone line 18, respectively. The panel switch selecting circuit 20 is coupled with the loop selection circuit 30. The facsimile card 16 is installed in the computer 14 as the prior art. When the facsimile card switch SW2 is switched on, the circuit 20 will activate the relays of the circuit 30 to couple the facsimile card and telephone line terminals 22 and 26 with each other. When the facsimile machine switch SW1 is switched on, the circuit 20 will activate the relays of the circuit 30 to couple the facsimile machine and telephone line terminals 24 and 26 with each other.

Figure 1:
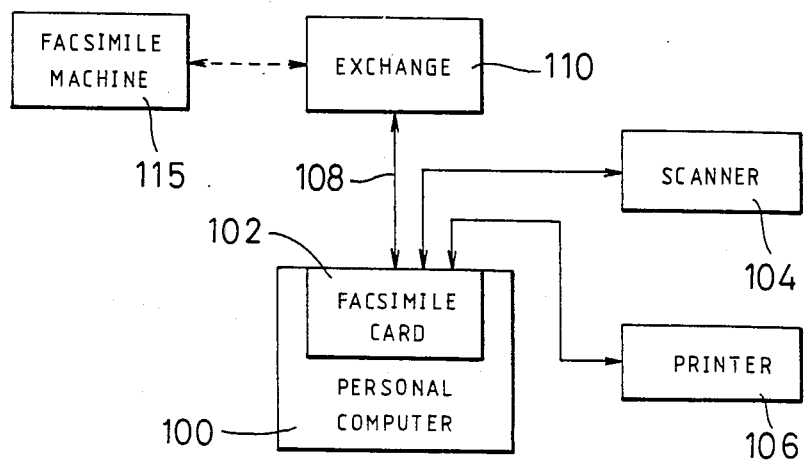
FIG. 1 is a block diagram of a conventional facsimile system.

If the telephone line terminal 26 is coupled with the facsimile card terminal 22, the facsimile transmission signals from the telephone line 18 will be stored within the personal computer 14 via the telephone line terminal 26, the loop selection circuit 30, the facsimile card terminal 22 and the facsimile card 16. Or, the document information within the computer 14 can be transmitted out to the telephone line 18 through the path reverse to the above-described path. This is similar to the transmitting manner of the facsimile system shown in FIG. 1. If the telephone line terminal 26 is coupled with the facsimile machine terminal 24, it requires a conventional facsimile machine directly connecting with the telephone line to intercommunicate with the other facsimile machine.

The device 10 further includes a line control circuit 32, a ringing generator 34 and a buzzer 36 (FIG. 3 or 8). The line control circuit 32 is coupled between the telephone line terminal 26 and the circuit 20. The ringing generator 34 is coupled between the telephone line terminal 26 and the buzzer 36. In the conventional telephone system, when one subscriber dials the telephone number of another subscriber, the exchange will send the telephone ringing signal, in the form of an alternating current, to the other subscriber. The telephone ringing signal will operate the telephone bell on the other subscriber's side to attract his attention. According to this invention, when the telephone ringing signal is sent from the exchange 15 (FIG. 2) and arrives at the telephone line terminal 26, the line control circuit 32 will turn on its indicating element LED6 (FIG. 8), and lock the panel switch selecting circuit 20 so that the selecting function of the circuit 20 remains locked until the end of the communication. Therefore, the coupling state of the loop selection circuit 30 will not be changed during the communication. Simultaneously, the telephone ringing signal will operate the ringing generator 34 to activate the buzzer 36 to generate a ringing to attract the subscriber's attention. This is similar to the conventional telephone.

The device 10 includes first and second telephone power generating circuits 40, 42 (FIG. 3 or 6) coupled with the loop selection circuit 30, and first and second intercom control circuits 50, 52 (FIG. 3 oe 6) coupled with the loop selection circuit 30, respectively. The device 10 also includes a ringing signal generating circuit 62 (FIG. 3 or 5) coupled with the first and second intercom control circuits 50, 52, and a ringing switching circuit 60 (FIG. 3 or 6) coupled with the first and second intercom control circuits 50, 52, the ringing signal generating circuit 62 and the loop selection circuit 30.

When the intercom switch SW3 of the panel switch selecting circuit 20 is switched on, the circuit 20 will activate the circuit 30 to couple the first and second telephone power generating circuits 40 and 42 with the facsimile card and facsimile machine terminals 22 and 24, respectively. The telephone power generating circuits are utilized to provide the facsimile card and facsimile machine with the telephone power, because at this stage the telephone line terminal is disconnected from the facsimile card and facsimile machine terminals. Under normal circumstances, the telephone power is supplied from the exchange, and is used for signalling between the subscriber and the exchange.

At this time, when the computer 14 sends out an intercom request signal, the signal will be sent to the first intercom control circuit 50 via the facsimile card 16, the facsimile card terminal 22, and the loop selection circuit 30. In response to the intercom request signal, the circuit 50 will turn on its indicating element LED1 (FIG. 6) and the ringing switching circuit 60, and activate the circuit 62 to generate an inner ringing signal similar to the telephone ringing signal created by the exchange. The inner ringing signal is sent to the facsimile machine 12 via the ringing switching circuit 60, the loop selection circuit 30 and the facsimile machine terminal 24. Therefore, the telephone installed with the machine 12 will ring to attract the user's attention. When the handset of the telephone of the machine 12 is lifted or the machine 12 automatically switches to the normal working state, an aknowledgement signal will be given at the facsimile machine terminal 26. The acknowledgement signal will be sent to the second intercom control circuit 52 via the facsimile machine terminal 24 and the loop selection circuit 30. In response to the acknowledgement signal, the circuit 52 will activate the loop selection circuit 30 to couple the facsimile card and facsimile machine terminals 22, 24 with each other, and shut off the circuits 60 and 62. When the end of the communication is detected, the first intercom control circuit 52 will discouple the facsimile card terminal 22 from the facsimile machine terminal 24.

If the facsimile machine 12 sends out the intercom request signal, the operating process of the device 10 is similar to that described above, but the operations of the first and second intercom control circuits 50 and 52 are mutually changed. According to this structure, the facsimile machine and the computer coupled with the device 10 of the present invention can intercommunicate with each other without transmission through the telephone line.

It should be noted that the device 10 is not limited to interfacing between a facsimile machine and a computer; it may interface between two facsimile machines or two computers to facilitate their intercommunication without transmission through the telephone line. The terminals of the device 10 may be expanded to connect more facsimile machines and/or computers.

The device 10 also includes a power supply 70 (FIG. 3 or 4) to supply the appropriate power to the appropriate place in the electrical circuit of the device 10. The device 10 may include a computer power control circuit 80 (FIG. 3 or 9) coupled with the ringing generator 34 and with the facsimile card terminal 22. The circuit 80 includes a power input terminal 82 coupled with commercial power, a power output terminal 84 coupled with the computer, and a manually-operated switch 86. When the switch 86 is switched on, power will be supplied to the computer. Or, when the ringing signal is received by the ringing generator 34, the ringing generator 34 will activate the circuit 80 to connect the power to the computer. When the facsimile card detects the end of the communication, it will activate the circuit 80 to disconnect the power from the computer. Therefore, it will become unnecessary to keep the computer continuously "power-on". In another embodiment, the circuit 80 need only be coupled with the facsimile card terminal 22 because the facsimile card can detect the ringing signal too. This can be easily done by those who are skilled in the art.

Since the circuits shown in FIGS. 4 to 9 are presumed apparent to those who are ordinarily skilled in this art, no further detailed description is deemed necessary.

While the invention has been described in terms of what is presently considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A selecting device for interfacing between a telephone line and two facsimile apparatuses, comprising:
   a telephone line terminal adapted to be coupled with said telephone line;
   two facsimile apparatus terminals adapted to be coupled with said two facsimile apparatuses respectively;
   a loop selection circuit coupled with said telephone line terminal and said facsimile apparatus terminals; and
   means, coupled with said loop selection circuit, for controlling said loop selection circuit selectively to couple any two of said telephone line terminal and said facsimile apparatus terminals with each other; said controlling means including two intercom control circuits coupled with said loop selection circuit, and a ringing signal generating circuit coupled with said intercom control circuits and with said loop selection circuit the controlling means operative such that when said two facsimile apparatus terminals are selected to be coupled with each other, and one of said facsimile apparatuses generates an intercom request signal which in turn is transmitted to one of said intercom control circuits via one of said facsimile apparatus terminals and said loop selection circuit, said one intercom control circuit, in response to said intercom request signal, activates said ringing signal generating circuit to generate an inner ringing signal which in turn is transmitted to the other facsimile apparatus via said loop selection circuit and the other facsimile apparatus terminal; and the controlling means further operative such that when said other facsimile apparatus generates an acknowledgement signal in response to said inner ringing signal, said acknowledgement signal in turn being transmitted to other of said intercom control circuits via said other facsimile apparatus terminal and said loop selection circuit, said other intercom control circuit, in response to said acknowledgement signal, shuts off said ringing signal generating circuit and controls said loop selection circuit to couple said two facsimile apparatus terminals with each other.

2. The device as claimed in claim 1, wherein said two facsimile apparatus terminals are a facsimile machine terminal adapted to be coupled with a facsimile machine and a facsimile card terminal adapted to be coupled with a facsimile card installed in a computer.

3. The device as claimed in claim 2, further comprising means, coupled with said telephone line terminal, for generating a ringing in response to the telephone ringing signal received from said telephone line terminal.

4. The device as claimed in claim 3, further comprising a computer power control circuit coupled with said ringing generating means and said facsimile card terminal, and having a power input terminal adapted to couple with a power source and a power output terminal adapted to couple with said computer; said ringing generating means activating said computer power control circuit to connect said power source to said computer when detecting the telephone ringing signal; and said facsimile card activating said computer power control circuit to disconnect said power source from said computer when detecting the end of the telephone communication.

5. The device as claimed in claim 2, further comprising a computer power control circuit coupled with said facsimile card terminal and having a power input terminal adapted to couple with a power source and a power output terminal adapted to couple with said computer; said facsimile card activating said computer power control circuit to connect said power source to said computer when detecting the telephone ringing signal, and to disconnect said power source from said computer when detecting the end of the telephone communication.

6. The device as claimed in claim 5, wherein said controlling means includes a panel switch selecting circuit coupled with said loop selection circuit and having three manually-operated switches for being selectively operated to activate said loop selection circuit to couple any two of said telephone line and said two facsimile apparatus terminals with each other; and a line control circuit coupled with said telephone line terminal and with said panel switch selecting circuit, respectively, to lock said panel switch selecting circuit when detecting the telephone ringing signal, sent from said telephone line, on said telephone line terminal, and to unlock said panel switch selecting circuit when detecting the end of the telephone communication.

7. The device as claimed in claim 6, wherein said controlling means includes two telephone power generating circuits coupled with said loop selection circuit, when said two facsimile apparatus terminals are selected to be coupled with each other, said loop selection circuit being controlled by said panel switch selecting circuit to couple said two telephone power generating circuits respectively with said two facsimile apparatus terminals in order to provide said facsimile apparatuses coupled with said facsimile apparatus terminals with telephone power.

8. A selecting device for interfacing between a telephone line and two facsimile apparatuses, comprising:

a loop selection circuit adapted to be coupled with said telephone line and said facsimile apparatuses; and means, coupled with said loop selection circuit, for controlling said loop selection circuit selectively to couple any two of said telephone line and said facsimile apparatuses with each other; said controlling means including two intercom control circuits coupled with said loop selection circuit and a ringing signal generating circuit coupled with said intercom control circuits and with said loop selection circuit the controlling means operative such that; when said two facsimile apparatuses are selected to be coupled with each other, and one of said facsimile apparatuses generates an intercom request signal which in turn is transmitted to one of said intercom control circuits via said loop selection circuit, and said one intercom control circuit, in response to said intercom request signal, activates said ringing signal generating circuit to generate an inner ringing signal which in turn is transmitted to the other facsimile apparatus via said loop selection circuit; and the controlling means further operative such that when said other facsimile apparatus generates an acknowledgement signal in response to said inner ringing signal, said acknowledgement signal in turn being transmitted to other of said intercom control circuits via said loop selection circuit, said other intercom control circuit, in response to said acknowledgement signal, shuts off said ringing signal generating circuit and controls said loop selection circuit to couple said two facsimile apparatuses with each other.

* * * * *